United States Patent
Andre et al.

(10) Patent No.: US 6,373,470 B1
(45) Date of Patent: Apr. 16, 2002

(54) CURSOR CONTROL DEVICE HAVING AN INTEGRAL TOP MEMBER

(75) Inventors: Bartley K. Andre, Menlo Park, CA (US); Adam S. Farag, Columbia, IL (US); Abraham S. Farag, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/482,152

(22) Filed: Jan. 12, 2000

(51) Int. Cl.[7] .................................................. G09G 5/08
(52) U.S. Cl. ........................ 345/166; 345/161; 345/163; 345/167; 345/156
(58) Field of Search ............................... 345/161, 163, 345/166, 167, 156

(56) References Cited

U.S. PATENT DOCUMENTS

| | | | | | |
|---|---|---|---|---|---|
| 4,917,516 | A | * | 4/1990 | Retter | 400/489 |
| 5,237,311 | A | * | 8/1993 | Mailley et al. | 340/710 |
| 5,751,274 | A | * | 5/1998 | Davis | 345/157 |
| 6,181,322 | B1 | * | 1/2001 | Nanavati | 345/156 |
| 6,198,473 | B1 | * | 3/2001 | Armstrong | 345/163 |

* cited by examiner

Primary Examiner—Richard Hjerpe
Assistant Examiner—Jean Lesperance
(74) Attorney, Agent, or Firm—Richard C. Liu

(57) ABSTRACT

A typical mouse presents great inconvenience to those who have very large hands, very small hands or those who have finger deformity. When the hands are very large, user fingers need to bend over in order to reach the button; when the hands are very small, user fingers need to stretch out in order to reach the button. None of which presents a comfortable position for these users. Furthermore, if there is any finger deformity involved, then there would be even greater difficulty in activating the mouse button for purposes such as data selection and command execution.

The present invention provides an improved computer mouse that has a mouse housing having a base member and a top member. The base member is configured primarily to make moving contact with the surface of a computer pad or a table. The top member is an integrated piece having no separate mechanical button disposed thereon. For data selection and command execution, the top member and the base member of the mouse are coupled and engaged in a manner that the entire top member via simple wrist action serves as a button for activating an internal switch to register palm clicking input. Advantageously, the present invention removes the awkwardness and discomfort for those large-handed, small-handed and deformed-handed users. All users may now comfortably select data or execute commands by simple and light wrist action.

9 Claims, 2 Drawing Sheets

CURSOR CONTROL DEVICE HAVING AN INTEGRAL TOP MEMBER

CROSS-REFERENCE TO RELATED APPLICATION

This patent application is related to a co-pending application filed by Abraham Farag et al., which is entitled "COMPUTER MOUSE HAVING A CLICKING FORCE ADJUSTMENT FEATURE" and which was filed concurrently with this patent application.

TECHNICAL FIELD

The present invention generally relates to cursor control devices for input to a computer system. In particular, the present invention relates to a computer mouse that has no mechanical switches configured in the form of buttons disposed on and flush with the mouse surface for data selection and command execution.

BACKGROUND ART & THE INVENTION SUMMARY

Cursor control devices are known to take a number of forms, which include track balls, joy sticks and the well-known computer mice. A computer mouse is currently a very common and useful input device especially in the computer graphics environment. It usually includes a mouse housing having a captured ball or sphere, a portion of which extends from the interior of the mouse housing. The mouse is moved over a generally flat surface, with the ball in contact with the surface so that the ball rolls over the surface defining the direction of the mouse movement across the surface. The ball movement in turn generates two-dimensional data input for computer cursor control, which is visible on the screen or monitor of the computer. A typical computer mouse may also be implemented without a captured ball. Instead of a ball, optical electronics may be used for generating cursor control signals. Regardless, a computer mouse for a Macintosh® computer manufactured and sold by Apple Computer, Inc. typically has an electro-mechanical switch configured in the form of a clicking button disposed on and flush with the top surface of the mouse. This mechanical clicking button is used for a number of functions such as for data selection and command execution. For example, a computer user moves the mouse on a pad or a tabletop to cause a corresponding movement of the monitor cursor to a displayed application icon. A subsequent single- or double-click finger action (depending on the icon type) on the button of the mouse sends an application execution signal to the computer.

There are various forms of a mechanical button on a mouse. Regardless of shapes and configuration, any typical and existing button is disposed near the top and front portion of the mouse where it is easily accessible to user fingers. In practice, the palm of a computer user would typically cover the top and back portion of the mouse, whereas at least one of the user fingers would naturally lie over the mechanical button located near the top and front portion of the mouse. It is and has been a convenient configuration for many, however, it presents great inconvenience to those who have very large hands or who have very small hands or those who have finger deformity whether by birth or by accidents. When the hands are very large, user fingers need to bend over in order to reach the button; when the hands are very small, user fingers need to stretch out in order to reach the button. None of which presents a comfortable position for these users. Furthermore, if there is any finger deformity involved, then there would be even greater difficulty in activating the mouse button for purposes such as data selection and command execution.

Therefore, it is desirable to provide an electro-mechanical switch preferably in the form of a button for a mouse configured in an improved manner to provide convenience and comfort for users. These users include those having very large hands, those having very small hands and those having the ill fortunes to suffer from finger deformity.

It is an object of the present invention to provide an improved computer mouse that has a mouse housing for containing electronics that generates cursor control signals. This housing includes a base member configured primarily to make moving contact with the surface of a computer pad or a table. This housing further includes an integral top member mechanically coupled to the base member to encase the electronics. The top member is an integrated piece having no separate mechanical button disposed on the top member. In addition, at least the back portion of the top member has an external contour that substantially conforms to the contour of the palm-side surface of the hand, when the hand is in a relaxed, neutral condition, with the palm-side surface generally downwardly and horizontally disposed. For data selection and command execution, the top member and the base member of the mouse are coupled and engaged in a manner that the entire top member serves as a button for activating an internal electronic switch to register palm clicking as an input to the electronics. Such palm clicking action can be easily effected by light wrist action. For example, one aspect of the present invention includes that the top member in one integral piece is continually biased toward a first position in a direction generally away from the base member. To generate a clicking action, the top member is being pushed down toward the base member to a second position by the palm-side surface of the user via wrist action. This aspect of the invention enables clicking action including single-click, double-click and click-and-drag features. Advantageously, in practice, the present invention removes the awkwardness and discomfort for those large-handed, small-handed and deformed-handed users. All users may now comfortably select data or execute commands by simple and light wrist action.

BRIEF DESCRIPTION OF THE DRAWINGS

The above advantages of our invention will no doubt become apparent upon a reading of the following descriptions and a study of the two figures of the drawing.

DETAILED DESCRIPTION OF THE PREFERRED EMBODIMENTS

With today's advances in computer mouse technology, the electro-mechanical switch designs for data selection and command execution generally do not require the rendering of fully detailed implementation diagrams. The definition of mechanical and electronic functionality allows those skilled in the art to design the desired computer mouse implementations. Accordingly, functionality will be described in detail with the accompanying drawings. Those of ordinary skill in the art, once given the following descriptions of the various functions to be carried out by the present invention will be able to implement the necessary mechanical and electrical arrangements in suitable technologies without undue experimentation.

Figure 1:
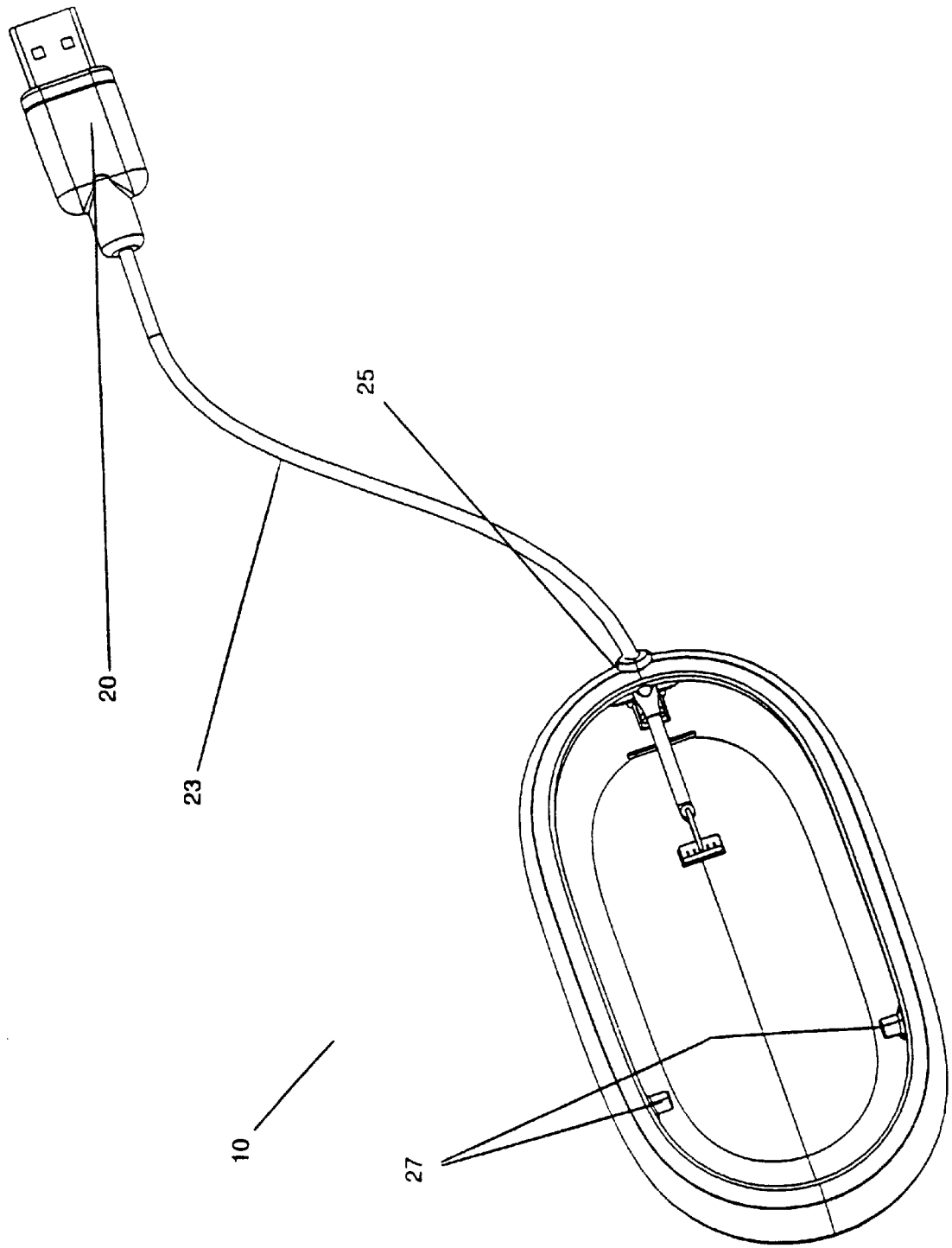
FIG. 1 is a simplified view of a computer mouse in accordance with the present invention.
Figure 2:
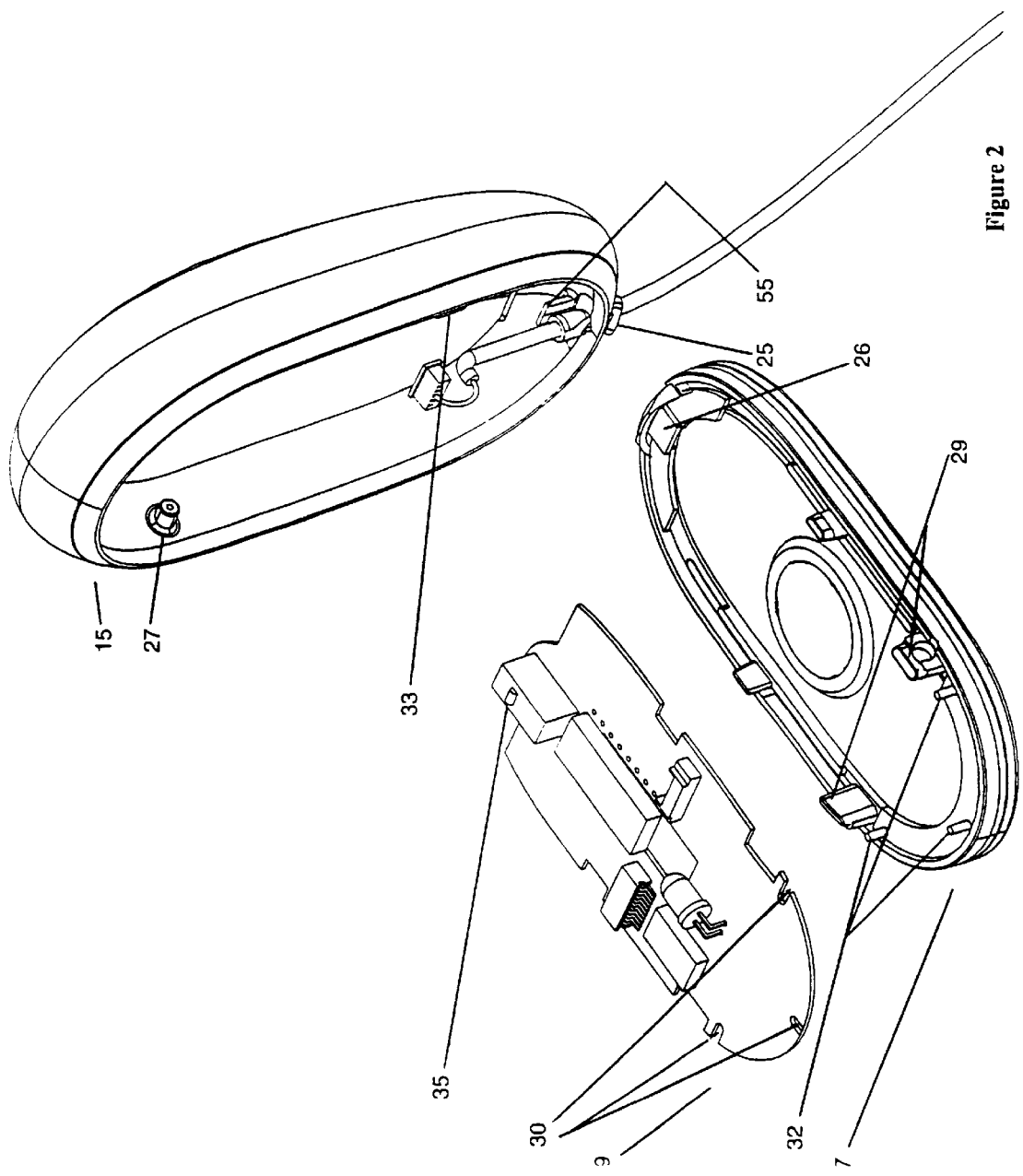
FIG. 2 is an another simplified and "de-coupled" view of the computer mouse illustrating implementing features of the computer mouse in accordance with the present invention.

Referring now to FIG. 1 and FIG. 2, two simplified views of a computer mouse 10 in accordance with the present invention are provided to illustrate its various implementation features. This computer mouse 10 includes a top member 15, a base member 17 and a PCB member 19. The top member 15 and the base member 17 coupling together form the housing of the computer mouse 10. Preferably, at least a major portion of the housing is made of translucent material so that electronics internal to the mouse 10 is at least partially visible externally. FIG. 1 and FIG. 2 are simplified in that not all of the internal structures of the housing are illustrated for purpose of clarity. An electrical connector 20, preferably a USB connector, connects the computer mouse 10 to a computer system (not shown). And a cable 23 couples the electrical connector 20 to the internal electronics that is mounted on the PCB member 19 through a front portion 25 of the top member 15. The PCB member 19 has indents 30, and they engage with corresponding extruding members 32 extending upward from the base member 17 to enable the PCB member 19 to be snuggly seated on the base member 17.

FIG. 1 again in a simplified manner, shows location of two internal pivots 27 of the top member 15 relative to the entire computer mouse 10. FIG. 2, on the other hand, shows only one internal pivot 27 (simplified). However, FIG. 2 further shows two snap mechanisms 29 disposed on the base member 17 appropriately configured to matingly engage the two internal pivots 27. Such engagement results in the formation of the housing of the computer mouse 10. A biasing spring pad 26 (spring mechanism not fully shown) on the base member 17 near the front portion 25 of the top member 15 is biased and configured in a manner to push the top member 15 in a direction away from the base member 17 to a first "un-clicked" position. This position may be defined and delimited by the configuration and action of the pivots 27 and snaps 29. As a user pushes down on the top member 15 in its entirety to click for data selection or command execution, an elongated member 33 engages an electrical switch 35 to effect a mouse click action. The elongated member 33 is located on the inside of the top member 15. During the clicking action, it 33 is being pushed against the electrical switch 35 mounted on the PCB member 19 to a second "clicking" position.

While the present invention has been described in terms of preferred embodiments, it is contemplated that persons reading the foregoing detailed description and studying the drawing will realize various alterations and modifications for this invention. It is therefore intended that the following appended claims be interpreted as including all such alterations and modifications as fall within the true spirit and scope of the present invention.

We claim:

1. A computer mouse having a mouse housing for containing mouse electronics, said mouse electronics being configured to acquire mouse movement information and in response thereto to transmit to a computer system monitor cursor control information, said computer mouse comprising:

a base member configured primarily to make moving contact with a top surface of a computer pad;

a top member being an integral piece and being mechanically coupled with the base member to form the mouse housing and to encase said mouse electronics, said top member further being externally contoured so that it being conforming to the contour of a palm-side surface of a user's hand, when the hand being in a relaxed, neutral condition, with the palm-side surface generally downwardly and horizontally disposed;

said top member being mechanically coupled to said base member in that the entire top member in one integral piece being continually biased in a direction generally away from the base member to a first position and that the top member being pushed down toward the base member to a second position by the palm-side surface via wrist action whereby creating a clicking action; and an electronic switch disposed inside the mouse housing being activated by said clicking action and responsively providing information to the mouse electronics for processing and transmitting the monitor cursor control information.

2. The computer mouse as recited in claim 1 wherein said information provided by the electronic switch to the mouse electronics includes a data selection signal.

3. The computer mouse as recited in claim 1 wherein said information provided by the electronic switch to the mouse electronics includes a command execution signal.

4. The computer mouse as recited in claim 1 wherein said clicking action includes a single-click feature.

5. The computer mouse as recited in claim 1 wherein said clicking action includes a double-click feature.

6. The computer mouse as recited in claim 1 wherein said clicking action includes a click-and-drag feature.

7. The computer mouse as recited in claim 1 wherein said mouse housing confines a ball in a manner that the ball rolling over the top surface of the computer pad defining the mouse movement information provided to the mouse electronics.

8. The computer mouse as recited in claim 1 wherein the mouse electronics includes an optical sensing circuit for acquiring the mouse movement information as the computer mouse moving across the top surface of the computer pad.

9. The computer mouse as recited in claim 1 wherein the mouse housing has at least a portion thereof being made of a translucent material in a manner that at least parts of the mouse electronics being visible externally.

* * * * *